United States Patent [19]

Baldwin

[11] 4,383,220

[45] May 10, 1983

[54] MICROWAVE ELECTROMAGNETIC BOREHOLE DIPMETER

[75] Inventor: Willett F. Baldwin, Dallas, Tex.

[73] Assignee: Mobil Oil Corporation, New York, N.Y.

[21] Appl. No.: 299,235

[22] Filed: Sep. 3, 1981

Related U.S. Application Data

[63] Continuation-in-part of Ser. No. 36,915, May 7, 1979, abandoned.

[51] Int. Cl.$^3$ .............................................. G01V 3/30
[52] U.S. Cl. .................................................... 324/338
[58] Field of Search ............... 324/333, 334, 338, 339, 324/341, 355

[56] References Cited

U.S. PATENT DOCUMENTS

| | | | |
|---|---|---|---|
| 2,455,941 | 12/1948 | Muskat et al. | 324/338 |
| 2,963,641 | 12/1960 | Nanz | 324/376 |
| 3,388,323 | 6/1968 | Stripling | 324/333 |
| 3,551,797 | 12/1970 | Gouilloud et al. | 324/338 |
| 3,849,721 | 11/1974 | Calvert | 324/338 |
| 3,944,910 | 3/1976 | Rau | 324/338 |
| 3,973,181 | 8/1976 | Calvert | 324/355 |
| 4,019,126 | 4/1977 | Meador | 324/333 |
| 4,092,583 | 5/1978 | Coates | 324/338 |

OTHER PUBLICATIONS

Calvert et al., "Electromagnetic Propagation ... A New Dimension in Logging", Paper Presented at 1977 47th Ann. Calif. Reg. Meeting of Soc. of Petr. Eng. of AIME, pp. 1–15.

Lynch, Edward J., Formation Evaluation, Harper & Row, Publishers, NY, Evanston and London, pp. 341–347.

Primary Examiner—Gerard R. Strecker
Attorney, Agent, or Firm—Charles A. Huggett; Michael G. Gilman; Frank J. Kowalski

[57] ABSTRACT

A method and system are described for determining the dip of subsurface formations penetrated by a borehole. The well is logged using a borehole tool that has at least three antennas spaced approximately equally around the borehole tool for transmitting electromagnetic energy into the earth and receiving electromagnetic energy therefrom. Each antenna array contains a single transmitting antenna and a single receiving antenna. Individual signals are generated representative of the characteristics of the electromagnetic energy detected by each individual receiving antenna. These signals are then compared one to the other to determine the dip of the subsurface formations penetrated by the borehole.

9 Claims, 4 Drawing Figures

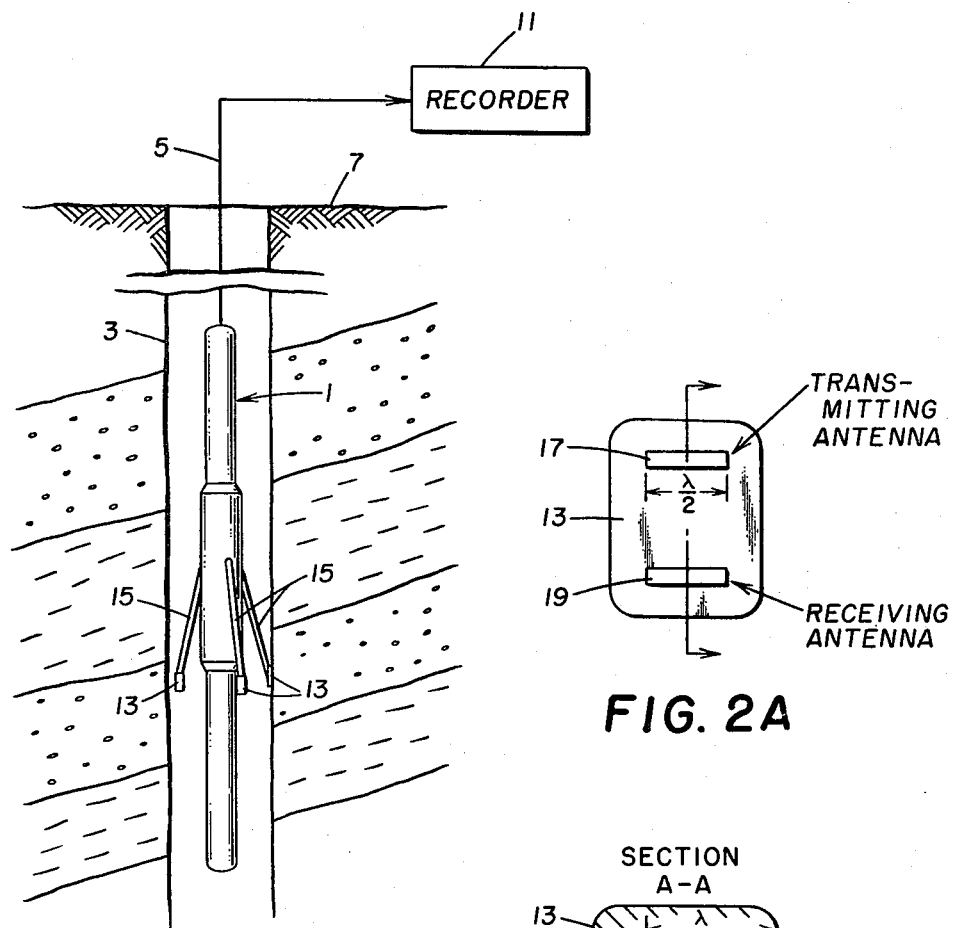
FIG. 1
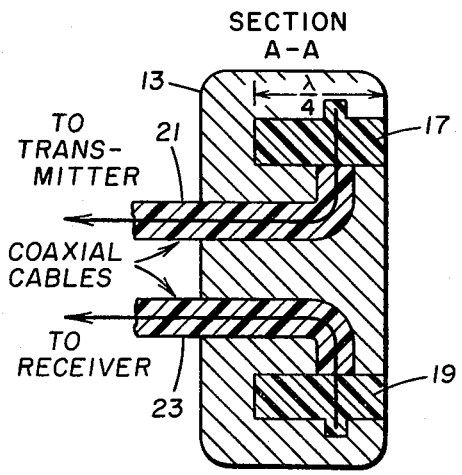
FIG. 2A
FIG. 2B

MICROWAVE ELECTROMAGNETIC BOREHOLE DIPMETER

BACKGROUND OF THE INVENTION

The present invention is a continuation-in-part of copending application Ser. No. 36,915 filed May 7, 1979, now abandoned.

This invention relates to a system and method for determining the dip of subsurface formations penetrated by a borehole. More particularly, this invention is directed to an apparatus and method that uses electromagnetic energy to determine a dip of subsurface formations penetrated by a borehole.

A discussion of the determination of dip of subsurface formations and of dipmeters is found in FORMATION EVALUATION by Edward J. Lynch, Harper & Row, Publishers, New York, Evanston and London, beginning at page 341. It is there pointed out that the problem of the determination of formation dip evolves into one of locating three points within a depositional layer with reference to a horizontal plane such that a plane is defined by the three points and the angle of dip is that angle between this plane and the horizontal plane. Instruments have been used which can record three electric logs properly spaced and oriented in a single borehole to determine the dip of the subsurface formations penetrated by the borehole. These instruments require an accurate directional survey of the borehole. Wireline dipmeters which are commonly used for this purpose must make three basic measurements. The first is the measurement of dip of the formation relative to the borehole. This has been done by including identical sets of electrodes spaced at 120° and all on the same plane perpendicular to the axis of the tool. The second is a measurement of the direction and angle of inclination of the borehole, and the third is a measurement of the orientation of the tool relative to magnetic north.

Early dipmeters used three SP curves to get the dip relative to the hole axis and used a photoclinometer to determine the hole inclination and direction. A continuous type of dipmeter later introduced employs three microlog devices to make the three required electrical logs. The microdevices are always pressed against the wall of the borehole, thus causing the spacing between them to change as the size of the borehole changes. This necessitates the recording of the borehole size.

In U.S. Pat. No. 3,388,323 to Allen A. Stripling, there is described a technique which has become known as "induction logging" for determining dip of subsurface formations. Two independent parameters indicative of magnetic susceptibility and electrical conductivity or resistivity are derived from magnetic field measurements carried out at three angular positions adjacent a borehole wall. Three coils are employed for carrying out the borehole measurements. These coils are energized to generate magnetic fields at three angular regions around the borehole wall, and the outputs thereof are phase separated into magnetic susceptibility and resistivity measurements. A 10,000-cycle-per-second oscillator and a 1,000-cycle-per-second oscillator are employed for energizing the coils. These high- and low-frequency oscillators are employed to increase the sensitivity of the coil to changes in electrical conductivity and magnetic susceptibility.

In a paper entitled "ELECTROMAGNETIC PROPAGATION . . . A New Dimension in Logging" by Thomas J. Calvert, Rama N. Rau, and Larry E. Wells, prepared for presentation at the 1977 47th Annual California Regional Meeting of the Society of Petroleum Engineers of AIME in Bakersfield, California, Apr. 13-15, 1977, there is described the operating principles of a well logging tool that measures the phase shift and attenuation of microwave-frequency energy propagated through the formations near a borehole. Also described is an interpretation method for deriving from these measurements the values of porosity and water saturation of earth formations. It is pointed out that this tool is most accurate in fresh water. It is further pointed out at page 15 that the tool is designed for fresh-mud applications and that signal levels may be too low in salt muds and signals are not reliable in oil- or gas-filled boreholes.

Logging techniques using electromagnetic energy are described in U.S. Pat. No. 3,551,797 to Michel Marie Albert Gouilloud et al; U.S. Pat. No. 3,849,721 to Thomas J. Calvert; U.S. Pat. No. 3,944,910 to Rama N. Rau; and U.S. Pat. No. 4,092,583 to George R. Coates.

SUMMARY OF THE INVENTION

This invention is directed to a method and system for determining dip of subsurface earth formations penetrated by a borehole. A borehole tool is provided that is adapted for moving through the borehole and that has at least three antenna arrays positioned approximately equally around the longitudinal axis of the tool. Each antenna array has only one transmitting antenna and one receiving antenna spaced longitudinally one from the other. The tool is adapted for supporting and positioning the antenna arrays against the wall of the borehole. The tool further includes means for simultaneously supplying electromagnetic energy of a frequency within the range of 1.0 to 3.0 gigahertz (GHz) to each of the transmitting antennas for transmitting electromagnetic energy into the earth formations. Further provided are means coupled to each of the receiving antennas for detecting the signal received by each receiving antenna.

BRIEF DESCRIPTION OF THE DRAWINGS

FIG. 1. is a schematic drawing illustrating the system for determining dip of subsurface formations located in a borehole.

FIGS. 2A and 2B are schematic views of a pad housing a transmitting and a receiving antenna.

DESCRIPTION OF THE PREFERRED EMBODIMENTS

Figure 3:
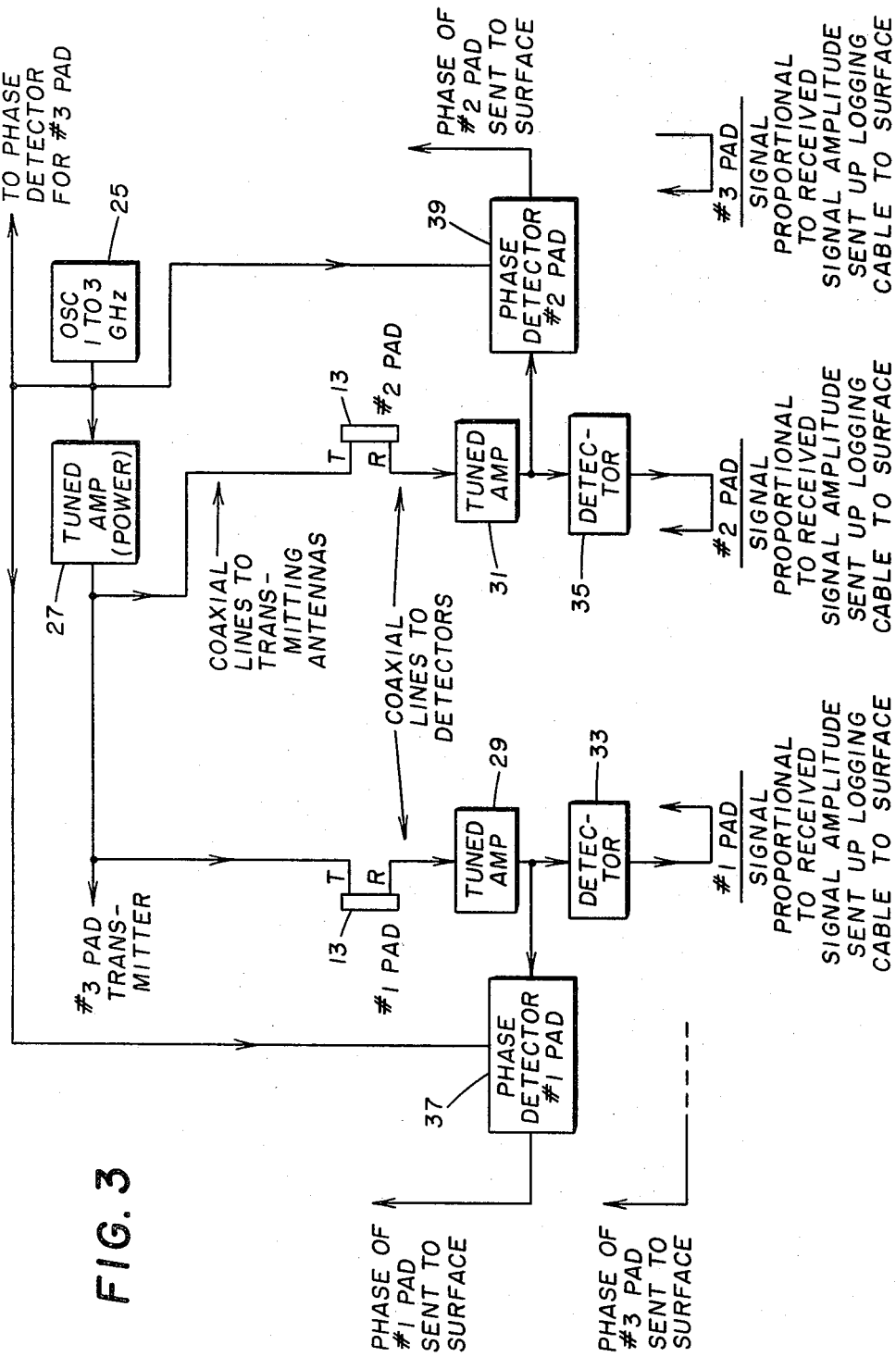
FIG. 3 is an electronic block diagram illustrating the system of determining dip of subsurface formations.

This invention is directed to a system and method for determining the dip of subsurface earth formations penetrated by a borehole. The system is comprised of a borehole dipmeter which utilizes electromagnetic energy for determining the dip of subsurface earth formations that are penetrated by a borehole.

The overall general appearance of the electromagnetic dipmeter is quite similar to conventional dipmeters. An elongated borehole tool is provided that is adapted for movement through the borehole. A multiconductor logging cable containing electrical conductors for transmitting electrical signals intermediate the surface of the earth and the borehole tool connects with the borehole tool and provides for lowering and raising the tool in the borehole. In operation, the logging cable extends to a means such as a reel for lowering and raising the tool in the borehole. The borehole tool includes at least three antenna arrays positioned from the longitudinal axis of the tool and spaced approximately equally around the axis, approximately 120° one from the other. More than three antenna arrays may be included but three are normally sufficient. Therefore for simplicity of description, this tool will hereafter be described as having three antenna arrays. Each of the antenna arrays has only one transmitting antenna and one receiving antenna spaced longitudinally one from the other. The tool is adapted for supporting and positioning the three antenna arrays against the wall of the borehole. A means is provided for simultaneously supplying electromagnetic energy of a frequency within the range of 1.0 to 3.0 gigahertz (GHz) to each of the transmitting antennas for continuously transmitting electromagnetic energy into the earth formations. Electromagnetic energy need not be continuously transmitted but may be pulsed or any type of periodic transmission. However, continuous transmission is preferred to obtain a continuous indication of formation changes. The receiving antennas have coupled thereto means for detecting the signal received by the receiving antenna. The means for detecting the signal received by the receiving antenna may be a means for determining the amplitude of the received signal, or a means for determining the phase of the received signal as compared to the transmitted signal. Further, the borehole tool may be adapted with both a means for determining the amplitude of the received signal and a means for determining the phase of the received signal.

The invention is now described in more detail by reference to the drawings. In FIG. 1 there is schematically shown an electromagnetic dipmeter 1 supported in a borehole 3 by a multiconductor logging cable 5 which extends from the electromagnetic borehole dipmeter 1 to the surface 7 of the earth. The multiconductor cable 5 is illustrated connecting with a recorder 11 for recording signals received by the electromagnetic dipmeter 1. The electromagnetic dipmeter 1 includes at least three pads 13 comprised of antenna arrays spaced approximately equally around the longitudinal axis of the dipmeter 1. The pads desirably are aligned along a horizontal plane which passes perpendicular through the longitudinal axis of the dipmeter 1. The pads 13 are adapted for being supported by the dipmeter 1 and positioned against the wall of the borehole 3. A support means 15 may be provided to support the pads 13 and to position them against the wall of the borehole 3. The dipmeter 1 also includes other conventional means for determining and transmitting to the surface of the earth such information as the size or caliper of the borehole, the deviation of the borehole from the vertical, the relative bearing of the borehole to the pads, and the compass bearing or azimuth of the pads.

With reference now to FIGS. 2A and 2B, there are shown front views and cross-sectional views of a pad 13 containing an antenna array comprised of one transmitting antenna and one receiving antenna. It is desirable that the pads 13 be of a relatively small size. This lessens the variance which might otherwise be caused by hole rugosity. It also increases the vertical resolution. In general terms, the overall dimensions of the pads 13 may be in the range of about three inches in width by five inches in length by one and one-half inches in thickness. The transmitting antenna 17 and the receiving antenna 19 desirably have a horizontal width of about one-half the wavelength of the electromagnetic energy to be used. The transmitting antenna 17 and the receiving antenna 19 desirably are located longitudinally one from the other about two to three inches. In FIG. 2B there is shown a cross-sectional view of the pad 13 along the line A—A. A coaxial cable 21 is shown extending from a transmitter (not shown) to the transmitting antenna 17. The slot making up the transmitter antenna 17 would extend from the face of the antenna for a distance of about one-fourth of the electromagnetic wavelength to be used back into the material of the pad 13. Another coaxial cable 23 is shown extending from a means for detecting the received signal, a detector (not shown), to the receiving antenna 19.

With reference now to FIG. 3, there is shown an electronic block diagram of the electromagnetic dipmeter. In this block diagram there are shown two of the three pads 13 of the electromagnetic dipmeter, further indicated as No. 1 pad and No. 2 pad. A similar electronic adaption would be used for the third pad. As previously discussed, the dipmeter could be adapted with more than three pads, but three pads are sufficient to obtain data indicative of the dip of subsurface formations penetrated by the borehole. An oscillator 25 for generating selected electromagnetic frequencies within the frequency range of 1 to 3 GHz is used in this electromagnetic dipmeter. Such oscillators have been used in downhole equipment as is illustrated in U.S. Pat. No. 3,944,910 and U.S. Pat. No. 4,092,583, which patents are concerned with investigating earth formations surrounding a borehole and with determining the water-filled porosity of formations surrounding a borehole. One oscillator 25 is sufficient for the present dipmeter.

In operation, the oscillator 25 generates electromagnetic energy within a selected frequency range of 1 to 3 GHz and desirably of a frequency of about 2 GHz, and this electromagnetic energy is transmitted to a tuned power amplifier 27 and thence through coaxial lines to the transmitting antennas T of No. 1 and No. 2 pads 13 (No. 3 pad not shown). The electromagnetic energy is continuously transmitted via the transmitting antennas of the pads 13 into the subsurface earth formations penetrated by the borehole. A trigger circuit (not shown) or the like may be inserted to pulse or restrict transmission of electromagnetic energy to the transmitting antennas of the pads 13. Electromagnetic energy is continuously received by the receiving antennas R of the pads 13. The received electromagnetic energy is transmitted via the coaxial lines to the tuned amplifiers 29 and 31. The signals from the tuned amplifiers 29 and 31 may then be passed to the detectors 33 and 35 for producing a signal proportional to the amplitude received by the receiving antennas of the pads No. 1 and No. 2. These signals, proportional to the received signal amplitudes, may then be sent up the multiconductor logging cable to the earth's surface and recorded. The signals from the tuned amplifiers 29 and 31 may also be sent to phase detectors 37 and 39 which determine the phase of the received signals as compared to the phase of the signals produced by the oscillator 25. The phase of the received signals may then be sent from the phase detectors 37 and 39 up the logging cable to the surface of the earth for recording. As discussed earlier, the borehole dipmeter may include either or both of the embodiments for determining the amplitude of the received signal or the phase of the received signal. At the surface, the amplitudes of the received signals from each of the pads 13 may be compared one to the other in a manner similar to that used by conventional induction or electrical dipmeters to determine the dip of the subsurface formations penetrated by the borehole. Likewise, the phase of the received signals may be compared one to the other to determine the dip of the subsurface formations. In logging boreholes, better results may be obtained in some cases using the amplitude comparison; while in others, better results may be obtained using the phase comparisons. For this reason it may be desirable to include both of these capabilities in the borehole dipmeter.

In using the system of this invention it is the relative phase, that is, the phase of the received signal as compared to the transmitted signal, which is recorded, not the absolute phase of the received signals. Thus, only one receiving antenna per pad is required. Actually, because of the rugosity of the borehole wall, it is highly desirable that the pads used in the dipmeter be as small as possible. The smallest pads can be constructed using only one transmitting and one receiving antenna. Thus, this is the configuration desired in this electromagnetic dipmeter.

This invention provides a method and apparatus that is particularly applicable for logging a borehole having therein a nonconductive fluid, such as an oil base drilling fluid, to determine the dip of subsurface formations penetrated by the borehole. The method and apparatus may also be used in logging boreholes having therein conductive fluids, such as water base drilling fluids.

In carrying out the method of this invention for determing the dip of subsurface earth formations penetrated by a borehole, there is moved through an open portion of the borehole a borehole having at least three antenna arrays spaced approximately equally around the tool with each of the antenna arrays having only one transmitting antenna and one receiving antenna spaced longitudinally one from the other. Desirably, this spacing is no more than three inches and preferably is within the range of two to three inches. Electromagnetic energy of a frequency within the range of 1.0 to 3.0 GHz, preferably about 2 GHz, is continuously transmitted via each of the transmitting antennas into the subsurface earth formations. Electromagnetic signals are continuously and separately received by each of the receiving antennas, and the received electromagnetic signals are continuously and separately detected. An output for each of the separately detected electromagnetic signals, representative of the characteristics of the separately detected electromagnetic signals, is generated and compared one to the other to determine the dip of the subsurface formations. The generated output may be the amplitude of the separately detected electromagnetic signals or the phase of the separately detected electromagnetic signals. Both the amplitude and phase of the separately detected electromagnetic signals may be detected, recorded, and correlated between the three pads to determine the dip of the subsurface formations.

I claim:

1. A system for determining the dip of subsurface earth formations penetrated by a borehole, comprising:
   (a) a borehole tool adapted for movement through said borehole and having at least three antenna arrays positioned from the longitudinal axis of said tool and spaced approximately equally around said axis, each of said antenna arrays having only one transmitting antenna and one receiving antenna spaced longitudinally one from the other, no more than three inches, said tool being adapted for supporting and positioning said at least three antenna arrays against the wall of said borehole;
   (b) means for simultaneously supplying electromagnetic energy of a frequency within the range of 1.0 to 3.0 GHz to each of said transmitting antennas for transmitting said electromagnetic energy into said earth formations; and
   (c) means coupled to each of said receiving antennas for detecting the signal received by each receiving antenna from which signals the dip may be determined.

2. The system of claim 1 further comprising means for determining the amplitude of the received signal coupled to each of said receiving antennas.

3. The system of claim 1 further comprising means for determining the phase of the received signal as compared to the transmitted signal coupled to each of said receiving antennas.

4. A system for determining the dip of subsurface earth formations penetrated by a borehole, comprising:
   (a) a borehole tool adapted for movement through said borehole and having at least three antenna arrays positioned from the longitudinal axis of said tool and spaced approximately equally around said axis, each of said antenna arrays having only one transmitting antenna for transmitting electromagnetic energy of a frequency within the range of 1.0 to 3.0 GHz and one receiving antenna spaced longitudinally one from the other a distance within the range of about to two to three inches, said tool being adapted for supporting and positioning said at least three antenna arrays against the wall of said borehole;
   (b) means coupled to each of said at least three antenna arrays for individually detecting the signal received by each of said at least three antenna arrays;
   (c) means for determining and recording the amplitude of each individually detected signal coupled to said means for detecting said signal; and
   (d) means for determining and recording the phase of each individually detected signal as compared to the transmitted signal coupled to said means for detecting said signal.

5. A method for determining the dip of subsurface earth formations penetrated by a borehole, comprising:
   (a) moving through an open-hole portion of said borehole a borehole tool having at least three antenna arrays spaced approximately equally around said tool, each of said antenna arrays having only one transmitting antenna and one receiving antenna spaced longitudinally one from the other a distance of no more than about three inches;
   (b) transmitting electromagnetic energy of a frequency within the range of 1.0 to 3.0 GHz via each of said transmitting antennas into said subsurface earth formations penetrated by said borehole;
   (c) receiving and detecting the electromagnetic signals received by each of said receiving antennas;
   (d) generating an output for each detected electromagnetic signal representative of the characteristics of said separately detected electromagnetic signal; and
   (e) comparing said generated output for each detected electromagnetic signal to determine the dip of said subsurface characteristics.

6. The method of claim 5 wherein in step (d) the generated output is the amplitude of said separately detected electromagnetic signal.

7. The method of claim 5 wherein in step (d) the generated output is the phase of said detected electromagnetic signal as compared to the transmitted signal.

8. The method of claim 5 wherein in step (d) there are generated first and second outputs for each detected electromagnetic signal that are representative of the amplitude and phase as compared to the transmitted signal, respectively, of said detected electromagnetic signal.

9. The method of claim 8 wherein the transmitted electromagnetic energy is of a frequency of about 2 GHz.

* * * * *